United States Patent Office 3,496,148
Patented Feb. 17, 1970

3,496,148
3,5 - DIOXO - PIPERAZINE ACETAMIDE-DIAMINE SYNTHETIC LINEAR RESINOUS POLYAMIDES
David E. Kramm, Laurel, and Joseph D. Moyer, Silver Spring, Md., assignors to W. R. Grace & Co., New York, N.Y., a corporation of Connecticut
No Drawing. Filed Sept. 20, 1967, Ser. No. 669,279
Int. Cl. C08g 20/00
U.S. Cl. 260—78
10 Claims

ABSTRACT OF THE DISCLOSURE

A synthetic linear polyamide is formed by reacting 3,5-dioxo-1-piperazine acetamide with a diamine.

---

The present invention relates to a novel and useful polyamide and a process for preparing it. More particularly, it relates to a synthetic linear polyamide formed by the reaction of 3,5-dioxo-1-piperazineacetamide and a diamine.

Synthetic linear polyamides are well known in the art and have received widespread acceptance. In general, the polyamides are quite difficult to prepare and quite expensive. It is an object of the present invention to prepare polyamides in a very easy and inexpensive manner. It is a further object to prepare polyamides in a process which does not necessarily require solution polymerization and does not need a catalyst. A further object is to prepare a novel group of polyamides which are useful for molding solid articles and useful as adhesives and thickeners for aqueous solutions. Other objects will become apparent as the description of the invention proceeds.

These objects are accomplished by the present invention which provides a synthetic linear polyamide having the recurring structural unit

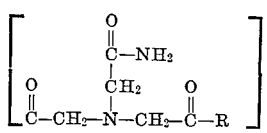

wherein R is a diamino radical.

The present invention also provides a process for the preparation of a synthetic linear polyamide which comprises reacting 3,5-dioxo-1-piperazineacetamide with a diamine and thereafter recovering the polyamide.

In carrying out the process of the present invention, a temperature of from about room temperature to about 225° C. is generally employed. Many of the reactions are mildly exothermic and do not require heating. However, heating hastens the reaction and the more elevated temperatures are preferred. Preferably, a temperature of from 100 to 180° C., more preferably from about 110 to about 175° C., is employed for the polymerization.

While any organic primary or secondary diamine or polyamine can be used in the practice of the present invention, the preferred amines are primary aliphatic diamines. Among the various diamines which may be utilized for preparing the polymers in the present invention are ethylene diamine, 1,3-propylene diamine, 1,5-pentanediamine, o-, m-, and p-phenylenediamine, 2,5-dimethylpiperazine, 1,6-hexanediamine, 1,12-dodecyldiamine, 1,4-diamino - 2 - butene, 1,2-propanediamine, 1,4-bis(aminomethyl)cyclohexane, 2,4-toluenediamine, 3,3'-dimethoxybenzidene, p,p' - methylenedianiline, 2,5 - toluenediamine, 3,4-toluenediamine, 4-chloro-o-phenylenediamine, m-xylylenediamine, and 1,4 - butanediamine. Other aliphatic, aromatic and heterocyclic primary and secondary diamines may also be used.

In preparing the polyamides, stoichiometric equivalent amounts of 3,5-dioxo-piperazineacetamide and the diamine are generally employed although as shown in the examples an excess of either of the reactants may be used if desired. In general, an excess of about 20% of either reactant may be employed without substantial alteration of the physical properties. Also, other amines or other acids may be utilized in the reaction to form copolymers which give some modification of the physical properties of the final polyamides.

The following examples aer given to illustrate the invention and are not intended to limit it in any manner. All parts are given in parts by weight unless otherwise expressed.

Example 1

A 1″ diameter 8″ long test tube is suspended in a silicone oil bath heated to a temperature of 165±2° C. The test tube is capped with a cork containing two tubes—an entry tube which extends to the bottom of the test tube and an exit tube which extends through the cork. Nitrogen is continuously flushed through the tubes at a rate of about 10 cc./min. The nitrogen stirs the reactants and at the same time excludes oxygen from the reaction site. The listed reactants are added to the tube in the indicated quantities. At this time a mild exothermic reaction takes place. The tube is then sealed with the cork, the nitrogen is turned on and the reaction proceeds.

| Condensation monomer | M.W. | Milli-moles | Grams |
|---|---|---|---|
| 3,5-dioxo-1-piperazineacetamide | 171.16 | 20 | 3.4232 |
| 1,6-hexanediamine | 116.20 | 20 | 2.3242 |

After a reactive time of 2 hours the heat is turned off. During the reaction period, ammonia gas is formed and swept out of the exit tube by the sparge gas. On cooling a brittle, water-white polyamide results. The polyamide is highly water soluble and hydroscopic. The polymer is useful as a water soluble adhesive.

Example 2

A 1″ diameter 8″ long test tube is suspended in an silicone oil bath heated to a temperature of 170±2° C. The test tube is capped with a cork containing two tubes—an entry tube which extends to the bottom of the test tube and an exit tube which extends through the cork. Nitrogen is continuously flushed through the tubes at a rate of about 10 cc./min. The nitrogen stirs the reactants and at the same time excludes oxygen from the reaction site. The listed reactants are added to the tube in the indicated quantities. The tube is sealed with the cork, the nitrogen is turned on and the reaction proceeds.

| Condensation monomer | M.W. | Milli-moles | Grams |
|---|---|---|---|
| 3,5-dioxo-1-piperazineacetamide | 171.16 | 20 | 3.4332 |
| Piperazine | 86.14 | 20 | 1.7228 |

After a reaction time of 2 hours the heat is turned off. During the reaction period ammonia gas is formed and swept out of the exit tubes by the sparge gas. On cooling a brittle, yellow polyamide results. The polymer is highly water soluble and hygroscopic. The polymer is useful as a water soluble adhesive. This example illustrates the use of a heterocyclic diamine wherein the amino group are secondary.

Example 3

A 1″ diameter 8″ long test tube is suspended in a silicone oil bath heated to a temperature of 170–175° C. The test tube is capped with a cork containing two tubes—an entry tube which extends to the bottom of the test tube and an axit tube which extends through the cork. Nitrogen is continuously flushed through the tubes at a rate of about 10 cc./min. The nitrogen stirs the reactants and at the same time excludes oxygen from the reaction site. The listed reactants are added to the tube in the indicated quantities. The tube is sealed with the cork, the nitrogen is turned on and the reaction proceeds.

| Condensation monomer | M.W. | Milli-moles | Grams |
|---|---|---|---|
| 3,5-dioxo-1-piperazineacetamide | 171.16 | 20 | 3.4232 |
| o-Phenylenediamine | 108.14 | 20 | 2.1630 |

After a reaction time of 2½ hours the heat is turned off. During the reaction period ammonia gas is formed and swept out of the exit tubes by the sparge gas. On cooling a hard, pinkish polyamide results. The polymer is water insoluble. The polymer is useful in making decorative molded articles. This example shows the use of an aromatic diamine.

Example 4

A 1" diameter 8" long test tube is suspended in an silicone oil bath heated to a temperature of 165±2° C. The test tube is capped with a cork containing two tubes—an entry tube which extends to the bottom of the test tube and an exit tube which extends through the cork. Nitrogen is continuously flushed through the tubes at a rate of about 10 cc./min. The nitrogen stirs the reactants and at the same time excludes oxygen from the reaction site. The listed reactants are added to the tube in the indicated quantities. The tube is sealed with the cork, the nitrogen is turned on and the reaction proceeds.

| Condensation monomer | M.W. | Milli-moles | Grams |
|---|---|---|---|
| 3,5-dioxo-1-piperazineacetamide | 171.16 | 20 | 3.4232 |
| m-phenylenediamine | 108.14 | 20 | 2.1630 |

After a reaction time of 2 hours the heat is turned off. During the reaction period ammonia gas is formed and swept out the exit tube by the sparge gas. On cooling a brittle, light brown polyamide results. The polymer is slightly soluble in water. The polymer is useful in the preparation of molded decorative articles. This example shows the use of an aromatic diamine.

Example 5

A 1" diameter 8" long test tube is suspended in an silicone oil bath heated to a temperature of 165±2° C. The test tube is capped with a cork containing two tubes—an entry tube which extends to the bottom of the test tube and an exit tube which extends through the cork. Nitrogen is continuously flushed through the tubes at a rate of about 10 cc./min. The nitrogen stirs the reactants and at the same time excludes oxygen from the reaction site. The listed reactants are added to the tube in the indicated quantities. The tube is sealed with the cork, the nitrogen is turned on and the reaction proceeds.

| Condensation monomer | M.W. | Milli-moles | Grams |
|---|---|---|---|
| 3,5-dioxo-1-piperazineacetamide | 171.16 | 20 | 3.4232 |
| p-Phenylenediamine | 108.14 | 20 | 2.1630 |

After a reaction time of 2 hours the heat is turned off. During the reaction period ammonia gas is formed and swept out of the exit tube by the sparge gas. On cooling a hard dark brown polyamide results. The polymer is slightly water soluble and hygroscopic. The polymer is useful in the prepartion of molded decorative articles. This example shows the use of aromatic diamines.

Example 6

A 4 neck round bottom 300 ml. reactor flask is heated with a "glas-Col" electric heating mantle. It is equipped with a mechanical stirrer in the center neck with the stirrer being equipped with a "Tru-bore" glass bearing which is water cooled and vacuum tight. The bearing shaft is connected to an electric stirring motor. In one of the other openings, a glass bubbler is inserted which delivers nitrogen as a sparge gas via a glass tube to the bottom of the reactor. In another neck a steam jacketed "Vigreux" distillation column is inserted. On the top of the "Vigreux" column a distillation take-off with a water cooled condenser is attached. At the top of the "Vigreux" column a thermometer (0 to 130° C. scale) is inserted for measuring the temperature. This system allows the ammonia to pass out of the reaction chamber but still retains the reactants. In the fourth neck of the reactor flask a thermometer is inserted to measure pot temperature. The listed reactants are added to the reactor flask in the indicated quantities. The reactants are heated to a temperature of 120° C.±5° C.

| Condensation monomer | M.W. | Milli-moles | Grams |
|---|---|---|---|
| 3,5-dioxo-1-piperazineacetamide | 171.16 | 0.303 | 51.898 |
| Ethylenediamine | 6.10 | 0.318 | 19.134 |

The above formulation represents a 5% stoichiometric excess of ethylenediamine over 3,5-dioxo-1-piperazine-acetamide.

After a reaction of 1 hour, the heat is turned off. During this reaction period ammonia gas is formed and swept out of the exit tube by the sparge gas. The reaction is operated at a reduced pressure of 660 mm. Hg to remove ammonia. On cooling a water white, brittle, water soluble, hygroscopic polyamide is formed.

While in the above examples, unmodified polyamides are produced, it is obvious that other materials such as dyes, pigments, fibers and comonomers and even other polymers may be introduced into the polyamides without substantial alteration of the physical properties of the polymer.

The polyamides of the present invention are useful as adhesives, thickeners for aqueous solution and may be molded into decorative panels, small plastic articles and the like. Other uses for the polyamides would be obvious to one skilled in the art.

Many equivalent modifications will be apparent to those skilled in the art from a reading of the foregoing without a departure from the inventive concept.

What is claimed is:

1. A synthetic linear resinous polyamide consisting essentially of the recurring structural unit

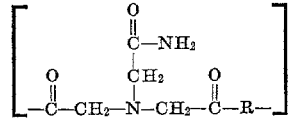

wherein R is a diamino radical selected from the groups consisting of ethylene diamine, 1,3-propylene diamine, 1,5-penthanediamine, o, m, and p-phenylene-diamine, 2,5-dimethylpiperazine, 1,6-hexanediamine, 1,12-dodecyldiamine, 1,4-diamino-2-butene, 1,2-propanediamine, 1,4-bis(aminomethyl) cyclohexane, 2,4-toluenediamine, 3,3'-dimethoxybenzidene, p,p'-methylenedianiline, 2,5-toluenediamine, 3,4-toluenediamine, 4-chloro-o-phenylenediamine, m-xylylenediamine, and 1,4-butanediamine.

2. The resinous polyaminde of claim 1 wherein R is the piperazino radical.

3. The resinous polyamide of claim 1 wherein R is the o-phenylenediamino radical.

4. The polyamide of claim 1 wherein R is the p-phenylenediamino radical.

5. The polyamide of claim 1 wherein R is the m-phenylenediamino radical.

6. The polyamide of claim 1 wherein R is the ethylenediamino radical.

7. The polyamide of claim 1 wherein R is the hexanediamino radical.

8. A process for the preparation of a synthetic linear resinous polyamide which comprises reacting up to an excess of about 20% stoichiometric equivalents of 3,5-dioxo-1-piperazineacetamide with up to an excess of about 20% stoichiometric equivalents of a diamine selected from the group consisting of ethylene diamine, 1,3-propylenediamine, 1,5-pentanediamine, o, m, and p-phenylenediamine, 2,5-dimethylpiperazine, 1,6-hexanediamine, 1,12-dodecyldiamine, 1,4-diamino-2-butene, 1,2-propanediamine, 1,4-bis(aminomethyl) cyclohexane, 2,4-toluenediamine, 3,3'-dimethoxybenzidene, p,p'-methylenedianiline, 2,5-toluenediamine, 3,4-toluenediamine, 4-chloro-o-phenylenediamine, m-xylylenediamine, and 1,4-butanediamine; said reaction taking place at a temperature from about room temperature to about 225° C.; and thereafter recovering the polyamide.

9. The process of claim 8 wherein the temperature of reaction is from 100 to 180° C.

10. The process of claim 8 wherein the temperature of reaction is about 110 to about 175° C.

References Cited

UNITED STATES PATENTS

| | | | |
|---|---|---|---|
| 3,297,655 | 1/1967 | Cislak | 260—78 |
| 3,143,527 | 8/1964 | Wittbecker | 260—78 |
| 3,143,530 | 8/1964 | D'Onofrio | 260—78 |

WILLIAM H. SHORT, Primary Examiner

E. M. WOODBERRY, Assistant Examiner

U.S. Cl. X.R.

260—29.2